(12) United States Patent
Yogev

(10) Patent No.: US 9,562,521 B2
(45) Date of Patent: Feb. 7, 2017

(54) HYBRID SYSTEM FOR ELECTRIC POWER GENERATION FROM SOLAR-THERMAL ENERGY AND WIND ENERGY SOURCES

(71) Applicant: Or Yogev, Gedera (IL)

(72) Inventor: Or Yogev, Gedera (IL)

(*) Notice: Subject to any disclaimer, the term of this patent is extended or adjusted under 35 U.S.C. 154(b) by 155 days.

(21) Appl. No.: 14/396,866

(22) PCT Filed: Apr. 24, 2013

(86) PCT No.: PCT/IL2013/050354
§ 371 (c)(1),
(2) Date: Oct. 24, 2014

(87) PCT Pub. No.: WO2013/160897
PCT Pub. Date: Oct. 31, 2013

(65) Prior Publication Data
US 2015/0108763 A1    Apr. 23, 2015

Related U.S. Application Data

(60) Provisional application No. 61/637,309, filed on Apr. 24, 2012, provisional application No. 61/648,709, filed on May 18, 2012.

(51) Int. Cl.
*F03G 6/06* (2006.01)
*F03D 9/00* (2016.01)

(52) U.S. Cl.
CPC ............... *F03G 6/06* (2013.01); *F03D 9/001* (2013.01); *F03D 9/002* (2013.01); *F03D 9/007* (2013.01);
(Continued)

(58) Field of Classification Search
CPC .......... F03D 9/001; F03D 9/002; F03D 9/007; F03D 9/17; Y02E 10/725; Y02E 60/15
See application file for complete search history.

(56) References Cited

U.S. PATENT DOCUMENTS

| 4,165,945 A | 8/1979 | Despois et al. |
| 4,229,941 A | 10/1980 | Hope |
(Continued)

FOREIGN PATENT DOCUMENTS

| GB | 2006878 A | 5/1979 |
| GB | 2013318 A | 8/1979 |
(Continued)

OTHER PUBLICATIONS

Extended European Search Report, dated Dec. 1, 2015 in corresponding application No. 15181648.

*Primary Examiner* — Tulsidas C Patel
*Assistant Examiner* — S. Mikailoff
(74) *Attorney, Agent, or Firm* — Browdy and Neimark, PLLC

(57) ABSTRACT

A hybrid system for electric power generation from solar-thermal energy and wind energy sources is described. The system includes a wind electric power generation system, a solar-thermal generation system and an air compressing system powered by a wind electric power generation system, and a compressed air storage system. A solar-thermal generation system includes two air receivers illuminated by heliostats to heat compressed atmospheric air provided from a compressed air storage system for driving the solar-thermal generation system. The hybrid system also includes a thermal energy storage system storing thermal energy and preheating the pressurized atmospheric air flow provided by the compressed air storage system.

21 Claims, 7 Drawing Sheets

(52) U.S. Cl.
CPC ............... *F03D 9/17* (2016.05); *Y02E 10/725* (2013.01); *Y02E 60/15* (2013.01)

(56) References Cited

U.S. PATENT DOCUMENTS

| | | | |
|---|---|---|---|
| 4,447,738 A * | 5/1984 | Allison | F03D 9/001 290/44 |
| 4,455,834 A * | 6/1984 | Earle | F01K 25/10 60/641.1 |
| 5,448,889 A | 9/1995 | Bronicki | |
| 6,661,113 B1 | 12/2003 | Bonin | |
| 7,067,937 B2 * | 6/2006 | Enish | F02C 6/16 290/55 |
| 7,086,231 B2 * | 8/2006 | Pinkerton | F02C 1/05 60/650 |
| 7,172,386 B2 | 2/2007 | Truong et al. | |
| 7,615,884 B2 * | 11/2009 | McMaster | F03D 9/00 290/44 |
| 7,964,981 B2 | 6/2011 | Tsao | |
| 8,739,533 B2 * | 6/2014 | Yogev | F01D 1/026 290/44 |
| 2004/0148922 A1 | 8/2004 | Pinkerton | |
| 2005/0225091 A1 * | 10/2005 | Enis | F02C 6/16 290/44 |
| 2006/0055175 A1 * | 3/2006 | Grinblat | F03B 13/26 290/54 |
| 2009/0033102 A1 * | 2/2009 | Enis | F03D 9/17 290/4 R |
| 2010/0117372 A1 * | 5/2010 | McMaster | F03D 9/00 290/55 |
| 2010/0307147 A1 | 12/2010 | Ivy et al. | |
| 2010/0320767 A1 * | 12/2010 | Knollman | F03B 13/24 290/54 |
| 2011/0169275 A1 | 7/2011 | Garvey | |
| 2012/0137684 A1 * | 6/2012 | Yogev | F01D 1/026 60/641.14 |
| 2013/0061591 A1 * | 3/2013 | Bove | F02C 6/16 60/645 |
| 2014/0196456 A1 * | 7/2014 | Zhou | F03D 1/04 60/659 |

FOREIGN PATENT DOCUMENTS

| | | |
|---|---|---|
| JP | S63239319 A | 10/1988 |
| WO | 2010125568 A2 | 11/2010 |
| WO | 2013119327 A1 | 8/2013 |

* cited by examiner

HYBRID SYSTEM FOR ELECTRIC POWER GENERATION FROM SOLAR-THERMAL ENERGY AND WIND ENERGY SOURCES

FIELD OF THE INVENTION

This invention relates generally to a system and method for solar energy utilization, and more specifically to a system and method for generation of electricity.

BACKGROUND OF THE INVENTION

A significant amount of research and development has been undertaken in recent years towards generation of energy from natural sources, such as sun and wind. Attempts to reduce reliance on oil and coal, such as from foreign sources, have become an important issue. Energy experts fear that some of these resources, including oil, gas and coal, may someday become exhausted.

Solar energy is known as a type of various clean energy sources that can be converted to produce electricity. However, the output of a solar power generating system relies to a great extent on weather conditions. For instance, many solar panels are designed to convert solar energy only during sunny daylight hours. They do not produce significant amounts of energy on cloudy days or during night hours.

While solar thermal power may be the most widely known natural source, there exists also the potential for harnessing significant amounts of energy from wind. Wind farms, for example, have been built in many areas where the wind naturally blows. To use wind energy for generation of electricity is a clean, renewable, and ecologically-friendly alternative to traditional fossil-based energy supplies.

One drawback of using wind as an energy source, however, is that the wind does not always blow, and even if it does, it does not always blow at the same speed, i.e., it is not always reliable. The wind also does not blow consistently throughout different times of the day, week, month and seasons of the year, i.e., it is not always predictable. Thus, due to the seasonal and daily variations in wind speed and power, the output of wind electrical generators often fluctuates, and is not reliable.

Accordingly, a major impediment to large-scale penetration of wind and solar energy is the variable and intermittent nature of solar and wind renewable resources. Intermittency leads to an unstable power output, causing significant challenges for distribution through the electric grid. The latter challenge also manifests itself into power-curtailing issues, which are becoming more and more apparent these days in the wind industry. Since wind energy in certain areas is mostly available during the night when the demand is low, it is required that the power from wind farms be curtailed to prevent overloading the grid.

Systems and methods for providing an integrated and complementary energy generating system capable of converting wind and solar energy for use with electrical generators are known in the art. During the daytime, such hybrid systems can concurrently derive energy from both wind and solar energy sources. During the nighttime, the systems can continuously harvest wind energy, regardless of weather conditions. As the peak of wind flow and sunlight tends to occur at different times of the day and year (for instance, winds are stronger in the winter with less sunlight and also stronger during nighttime), these two energy sources can complement each other.

For example, U.S. Pat. No. 4,229,941 to Hope describes a unitary system for generating electrical energy from solar and wind energy sources. The system includes a solar collector that collects solar rays, and these rays are focused by a parabolic mirror before being conducted through a fresnel tube to a container which minimizes thermal exchange with the exterior environment. The thermal energy of the rays within the container is converted to mechanical energy by a boiler and a steam-operated turbine. A wind collector converts air currents to mechanical energy which is selectively mechanically coupled to the mechanical energy derived from the solar collector prior to being converted to electrical energy.

U.S. Pat. No. 6,661,113 describes a power generating system that includes a base assembly that has a lower portion and an upper portion. The lower portion is for supporting the upper portion of the base assembly. A solar assembly is coupled to the upper portion of the base assembly. A power storage assembly is operationally coupled to the solar assembly. The power storage assembly is for storing electricity from the solar assembly. The power storage assembly is positioned in the lower portion of the base assembly such that the lower portion of the base assembly is for protecting the power storage assembly from adverse weather. A turbine assembly is coupled to the upper portion of the base assembly. The turbine assembly is for producing electricity from wind. The turbine assembly is operationally coupled to the power storage assembly such that the power storage assembly is for storing electricity produced from the turbine assembly.

U.S. Pat. No. 7,172,386 to Sosonkina et al. describes a wind and solar power plant, producing electrical energy. The system comprises rotor trains, mounted on decks of a garage-like building, each rotor train having a plurality of rotors positioned between a shroud and a wind tunnel. The wind is accelerated in a low middle part of the wind tunnel while it flows from a high entrance towards a higher and wider exit. The blades of the rotors protrude into the middle part of the wind tunnel causing fast rotation of the rotors around horizontal axes. A super-diffuser, a booster and a wind tunnel increase the power of the wind and rotors hundreds of times. Each rotor train comprises up to six rotors connected with twelve electrical generators. Electrical energy can be also produced by solar panels, mounted on the balconies and on the roof of a building.

U.S. Pat. No. 7,964,981 to Tsao describes an integrated hybrid energy generating system capable of converting wind and solar energy for use with an electrical generator. The system includes a wind powered subsystem including: a rotor for receiving wind to generate mechanical energy; and a first shaft for providing a permanent mechanical coupling between the rotor and the electrical generator for transferring the generated mechanical energy to the electrical generator. The system also includes a solar powered subsystem including: a solar collector for receiving solar energy to generate thermal energy; a thermo-mechanical engine coupled to the solar collector for converting the generated thermal energy into mechanical energy; and a second shaft mechanically coupled to the thermo-mechanical engine; and an interconnection subsystem for selecting between coupling the second shaft to the first shaft for combining the mechanical energy generated by the wind and solar powered subsystems to be transferred to the electrical generator, and decoupling the second shaft from the first shaft. During the daytime, the system concurrently derives energy from both wind and solar energy sources. During the nighttime, it continuously harvests wind energy, regardless of weather conditions.

SUMMARY

Despite the prior art in the area of solar and wind energy utilization techniques for generation of electric power, there is still a need in the art for further improvement in order to provide a more economical and low-cost system and method for solar and wind energy utilization.

The variability of the wind and solar resource also leads to low capacity utilization of the installed wind or solar plant. Thus, it would be advantageous to provide a hybrid system that utilizes both sources and which can reduce fluctuation in the combined energy output, and thus produce more power in the daytime for urban and suburban areas, when electricity demand is usually higher.

It would also be advantageous to have an improved system and method which can effectively utilize available energy from wind turbines and store it for later use.

The present invention satisfies the aforementioned need by providing a hybrid system for electric power generation from solar-thermal energy and wind energy sources.

According to an embodiment of the present invention, the hybrid system includes a wind turbine electric power generation system configured for receiving wind to generate electric power.

The hybrid system also includes an air compressing system electrically coupled to said wind turbine electric power generation system and driven by the electric power received therefrom. The air compressing system includes a cooling system configured for passing atmospheric air through the compressing system for cooling thereof, and for releasing heat removal air having a temperature higher than the temperature of the atmospheric air.

The hybrid system also includes a compressed air storage system configured for receiving compressed atmospheric air from the air compressing system and for storing compressed atmospheric air at a predetermined pressure.

The hybrid system also includes an electric power thermal generation system configured for receiving a pressurized heated air flow to generate electric power.

The hybrid system also includes a first air receiver configured for receiving the compressed atmospheric air flowing from said compressed air storage system, for heating the pressurized atmospheric air to a predetermined heating temperature, and for releasing a pressurized heated air flow for driving said electric power thermal generation system.

The hybrid system further includes a thermal energy storage system that is in air flow communication with the air cooling system and with the thermal energy storage system. The thermal energy storage system is configured for storing thermal energy transferred from the air cooling system and for preheating the pressurized atmospheric air flow provided by said compressed air storage system.

The hybrid system also includes a second air receiver configured for receiving preheated compressed air flowing from the thermal energy storage system, for further heating the pressurized preheated air to a predetermined heating temperature and for releasing a pressurized heated air flow to drive the electric power thermal generation system.

The hybrid system also includes a plurality of heliostats configured for receiving solar light and reflecting the solar light into said first air receiver and said second air receiver.

According to an embodiment of the present invention, the hybrid system further includes a first three-ports valve having one first valve inlet. This inlet is in gas flow communication with the thermal energy storage system. The first three-ports valve also includes two first valve outlets. The first three-ports valve is configured to permit connection of the inlet to either one or to both first valve outlets.

According to an embodiment of the present invention, the hybrid system further includes a second three-ports valve having two second valve inlets and one second valve outlet. One inlet of these two second valve inlets is in gas flow communication with the first air receiver, whereas another inlet of said two second valve inlets is in gas flow communication with the second air receiver. The second three-ports valve is configured to permit connection of the sole second valve outlet to both two second valve inlets.

According to an embodiment of the present invention, the hybrid system further includes a fan being in gas flow communication with the second air receiver and with the thermal energy storage system. The fan is configured to provide air circulation between the second air receiver and the thermal energy storage system for transferring heat therebetween.

According to an embodiment of the present invention, the wind turbine electric power generation system includes a tower, and an electric power generating apparatus rotatably mounted to the tower to rotate about a vertical axis of rotation centrally passing through the tower. The power generating apparatus includes a blade section and a nacelle section. The blade section includes a plurality of turbine blades, and a rotation hub to which the blades are connected. The nacelle section includes a rotary speed changing drive system mechanically coupled to the blade section, and a wind electric power generator mechanically coupled to the rotary speed changing drive system.

According to an embodiment of the present invention, the air compressing system includes an air compressor, a booster, and cooling system configured for cooling the air compressor and the booster.

According to an embodiment of the present invention, the cooling system includes an air inlet and an air heat removal outlet. The air cooling system is configured for receiving ambient atmospheric air through the air inlet, for passing the ambient atmospheric air through the compressing system for cooling thereof, and for releasing heat removal air having a temperature higher than a temperature of the atmospheric air through the heat removal air outlet. The heat removal air is fed to the thermal energy storage system.

According to an embodiment of the present invention, the first air receiver and the second air receiver are both mounted on the tower under the wind turbine electric power generation system.

According to an embodiment of the present invention, the thermal energy storage system includes a housing containing heat capacitive elements. Examples of the heat capacitive elements include, but are not limited to, a ceramic three dimensional matrix, checker-work heat medium elements, a rock-bed, pebbles, etc.

According to an embodiment of the present invention, the electric power thermal generation system includes a thermal turbine activated by the pressurized heated air flow provided by the first air receiver and by the second air receiver.

According to an embodiment of the present invention, the electrical power generated by the wind turbine electric power generation system is combined with the electrical power generated by the electric power thermal generation system.

According to an embodiment of the present invention, the thermal energy storage system is configured to have a gradual temperature profile during operation. For example, the highest temperature of the gradual temperature profile is around 800° C., whereas the lowest temperature of the gradual temperature profile is around 200° C.

According to an embodiment of the present invention, the thermal energy storage system includes a heater configured to maintain the highest temperature of the gradual temperature profile during operation.

According to an embodiment of the present invention, the first air receiver and/or the second air receiver include(s) two receiver headers having a tubular shape and being in a parallel arrangement, and a plurality of absorber tubes coupling the receiver headers to each other to provide a gas communication between the receiver headers.

According to an embodiment of the present invention, each absorber tube has an omega-type shape having two leg portions at the ends of the absorber tube attached to the receiver headers, and a round portion between the leg portions.

According to an embodiment of the present invention, the air receiver further includes a receiver shield surrounding the round portion of the absorber tubes, and forming a receiver cavity in which the round portion of the absorber tubes are located.

According to an embodiment of the present invention, the receiver shield has a highly reflective and diffusive inner surface that faces the absorber tubes.

According to an embodiment of the present invention, the compressed air storage system includes a cavity arranged in the ground at a predetermined depth, and an underground pressure tank mounted within the cavity.

According to an embodiment of the present invention, the underground pressure tank includes an inflatable elastic balloon.

According to an embodiment of the present invention, the underground pressure tank further includes a water balloon arranged within the inflatable elastic balloon.

The technique of the present invention has many of the advantages of the prior art techniques, while simultaneously overcoming some of the disadvantages normally associated therewith.

The present application integrates the utilization of solar and wind resources at a given location using the same power generating equipment. This leads to a significant reduction of intermittency effects, associated with intermittent nature of solar and wind energy sources. Moreover, it may result in decrease of levelized cost of energy (LCOE) generated by the system of the present application and results in improvement of capacity utilization of solar and wind energy.

The system according to the present invention may be easily and efficiently fabricated and marketed.

The system according to the present invention is of durable and reliable construction.

The system according to the present invention may have a relatively low manufacturing cost.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, embodiments will now be described, by way of non-limiting example only, with reference to the accompanying drawings, in which.

LIST OF REFERENCE NUMERALS

Figure 1:
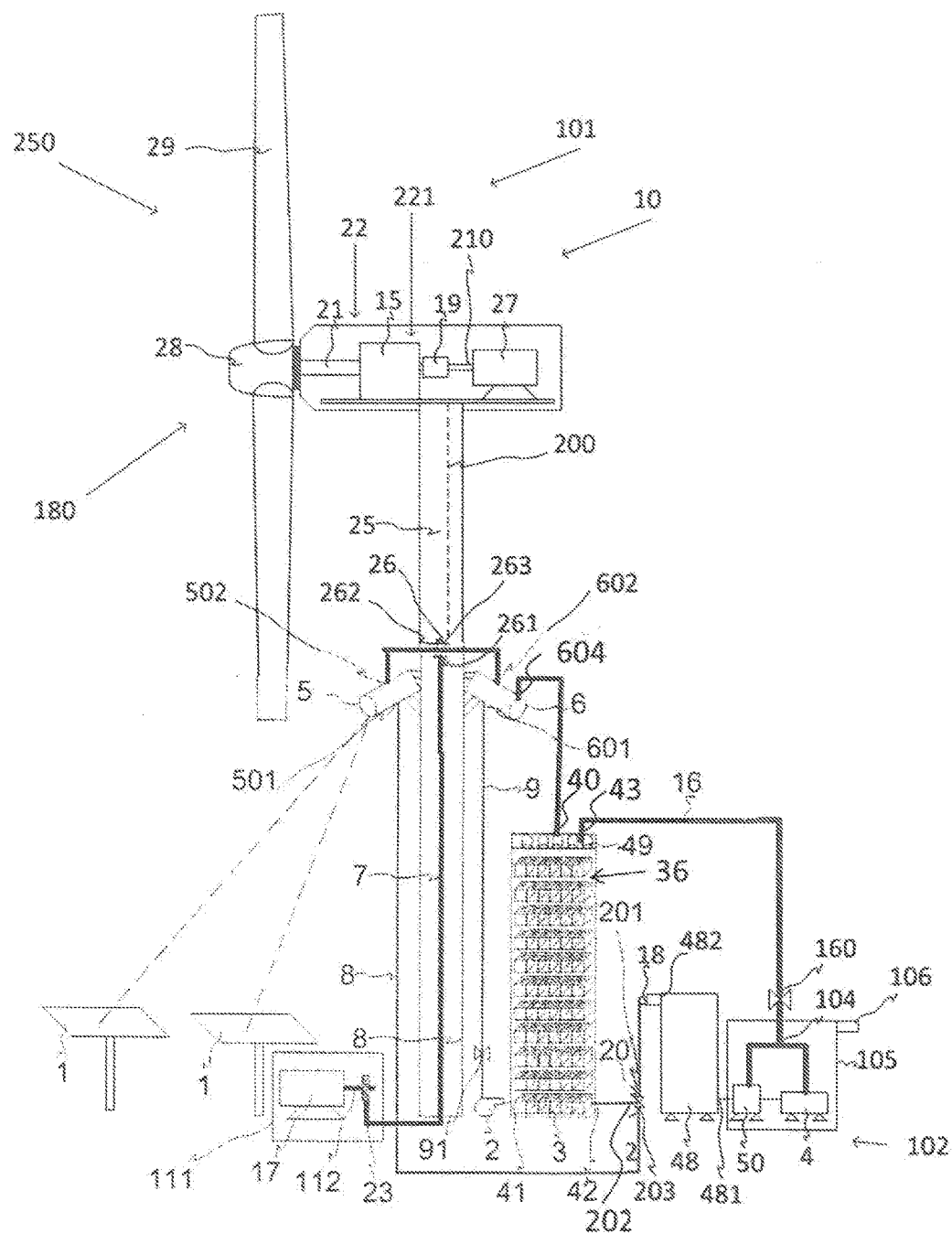
FIG. 1 is a schematic elevation view of a hybrid system for electric power generation from solar-thermal energy and wind energy sources, according to one embodiment of the present invention.

1—Heliostats
2—Fan
3—Thermal energy storage system
4—Air compressor
5—First air receiver
6—Second air receiver
7—Hot air pipe
8—Cold air pipe
9—Preheated air pipe
10—Hybrid system
15—Gear box transmission module
16—Heat removal pipe
17—Electrical thermal generator
19—Brake module
18—Air control valve
20—First three-ports valve
21—Hub shaft
22—Nacelle section
23—Thermal turbine
25—Tower
26—Second three-ports valve
27—Wind electric power generator
28—Rotation Hub
29—Turbine blades
30—Receiver shield
31a and 31b—Receiver headers
32—Absorber tubes
36—Heat capacitive elements
40—Hot air port
41—Preheated air outlet port
42—Compressed atmospheric air inlet port
43—Heat exchange air inlet
48—Compressed air energy storage system
49—Heater
50—Booster
52—Cavity arranged in the ground 53—Inflatable elastic balloon
54—Air conductive pipe
57—Water balloon
60—Three-ports air valve is switched to connect
61—First port of three-ports air valve 60
61—Second port of three-ports air valve 60
63—Third port of three-ports air valve 60
68—Rear end of the header 31b
69—Front end of the header 31a
70—Wind turbine rectifier
76—Thermal rectifier
91—Preheated air valve
101—Wind turbine electric power generation system
102—Air compressing system
104—Heat removal air outlet
105—Air cooling system
111—Electric power thermal generation system
112—Turbine shaft
160—Heat removal valve
180—Blade section
201—First valve inlet
202 and 203—First valve outlets
210—Generator shaft
221—Rotary speed changing drive system
230—Rotor-stator pairs
231—Stator
232—Nozzle blades
233—Rotor blades
234—Rotor
250—Power generating apparatus
252—Blade section
261—Second valve outlet
262 and 263—Second valve inlets
300—Air receiver
321—Round portion of Absorber tubes
322 and 323—Leg portions of Absorber tubes
330—Receiver cavity
331—Receiver aperture
351—Header inlet port
352—Header outlet port
353—Header section
451—Soil shear planes
481—Compress air storage system inlet port
482—Compress storage air system outlet port
485—Underground pressure tank
501—First air receiver inlet
502—First air receiver outlet
601—Second air receiver inlet
602—Second air receiver outlet
604—Circulation air inlet

DETAILED DESCRIPTION OF EMBODIMENTS

The principles and operation of the apparatus for electric power generation from solar-thermal energy and wind energy sources according to the present invention may be better understood with reference to the drawings and the accompanying description. It should be understood that these drawings are given for illustrative purposes only and are not meant to be limiting. It should be noted that the figures illustrating various examples of the apparatus of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. Those versed in the art should appreciate that many of the examples provided have suitable alternatives which may be utilized.

Referring to FIG. 1, a schematic view of a hybrid system 10 for electric power generation from solar-thermal energy and wind energy sources is illustrated, according to one embodiment of the present invention. The hybrid system 10 includes a wind turbine electric power generation system 101 configured for receiving wind to generate electric power. The turbine electric power generation system 101 can be any suitable wind turbine system generating electric power including, generally, a vertically aligned tower 25 which can be supported by a base (not shown). At the upper end of the tower 25, there is an electric power generating apparatus 250 which is rotatably mounted to the tower 25 to rotate about a vertical axis 200 of rotation centrally passing through the tower 25. The power generating apparatus 250 includes a blade section 180 and a nacelle section 22 commonly used with wind turbines.

The blade section 180 includes a plurality of turbine blades 29, and a rotation hub 28 to which the blades 29 are connected. The nacelle section 22 includes a rotary speed changing drive system 221 mechanically coupled to the blade section 180 and a wind electric power generator 27 mechanically coupled to the rotary speed changing drive system 221. The speed changing drive system 221 includes a gear box transmission module 15 coupled to the rotation hub 28 of the blade section 180 through a hub shaft 21 for matching the rotating speed between the rotation hub 28 and the wind electric power generator 27, and a brake module 19 mechanically coupled to the gear box transmission module 15. The wind electric power generator 27 is mechanically coupled to the brake module 19 through a generator shaft 210 driving the wind electric power generator 27. The wind electric power generator 27 can provide electricity to a user when it is coupled to a grid (not shown). Moreover, as is described hereinbelow, the wind electric power generator 27 can provide electric power to other elements of the hybrid system 10.

According to an embodiment of the present invention, the hybrid system 10 also includes an air compressing system 102 electrically coupled to the wind turbine electric power generation system 101. The air compressing system 102 is electrically coupled to the wind turbine electric power generation system 101 and is driven by the electric power received therefrom.

According to an embodiment of the present invention, the air compressing system 102 includes an air compressor 4 and a booster 50. The air compressor 4 can, for example, be a large-scale air compressor 4 that is configured as a centrifugal compressor. Such a centrifugal compressor can, for example, operate to provide a 1:10 compression ratio. The booster 50 can, for example, be configured as a piston based compressor with a compression ratio in the range of 1:4 to 1:20. In operation, the booster 50 receives preliminary compressed air, for example at 10 bar, from the air compressor 4, and further compresses this air to a higher air pressure that can be in the range of 40 bar to 200 bar. The compressed air is then fed to the thermal energy storage system 3 where it can be stored for further use.

Since the air temperature increases during the compression process, the air compressing system 102 includes a cooling system 105 for cooling both air compressor 4 and a booster 50. As a result of the cooling, excessive heat can be removed from these devices during the compression process. The cooling system can, for example, use cold water that circulates in a cooling radiator (not shown). Likewise, the cooling system 105 can be based on circulation of atmospheric air. In this case, the air cooling system has an air inlet 106 and an air heat removal outlet 104. The air cooling system 105 is configured for receiving ambient atmospheric air through the air inlet, passing the ambient atmospheric air through the compressing system 102 for cooling thereof, and for releasing heat removal air having a temperature higher than a temperature of the atmospheric air through the heat removal air outlet 104.

The heat removal process is based on employing forced convection. According to an embodiment of the invention, the cooling system 105 of the air compressing system 102 can include a heat exchanger (not shown) surrounding the compressor 4 and the booster 50, in which the air (herein also referred to as cold air) at ambient temperature exchanges heat with the compressed air that is heated by the compressor 4 and the booster 50 during the compression process. As a result, the cold air is heated while the compressed air gets colder. The heated ambient air is released through the heat removal air outlet 104 of the cooling system 105.

According to an embodiment of the present invention, the ambient air that is heated in the air compressing system 102 and released through the heat removal air outlet 104, is not discharged to the atmosphere, but rather is used for preheating the air compressed by the air compressing system 102, as will be described hereinbelow in detail. For example, the temperature of the heated ambient air released through the heat removal air outlet 104 can be around 200° C.

According to an embodiment of the present invention, the hybrid system 10 also includes a compressed air energy storage system 48 having a storage system inlet port 481 and a storage system outlet port 482. The storage system inlet port 481 is in gas flow communication with the air compressing system 102. The compressed air energy storage system 48 is configured for receiving compressed atmospheric air from the air compressing system 102 and for storing it at a predetermined pressure. The predetermined pressure can, for example, be in the range of 40 bar to 200 bar.

According to one example, the thermal energy storage system 48 can be configured as a standard high pressure tank. According to another example, the compressed air storage system 48 can be configured as an underground cavern. According to yet another example, the compressed air storage system 48 can be configured as a novel underground elastic tank. This example will be described hereinbelow in detail.

According to an embodiment of the present invention, the hybrid system 10 also includes a first three-ports valve 20 having one first valve inlet 201 being in gas flow communication with the outlet port 482 of the compressed air storage system 48 through an air control valve 18, and two first valve outlets 202 and 203. The first three-ports valve 20 is configured to permit connection of the first valve inlet 201 to either one or to both first valve outlets 202 and 203.

According to an embodiment of the present invention, the hybrid system 10 also includes a first air receiver 5 having a first air receiver inlet 501 and a first air receiver outlet 502. The first air receiver inlet 501 is in gas flow communication with the outlet 203 of the two first valve outlets. The first air receiver 5 is configured for receiving the compressed atmospheric air through the first air receiver inlet 501. The compressed atmospheric air flows from the compressed air storage system 48 through the first three-ports valve 20. The first air receiver 5 is also configured for heating the compressed atmospheric air to a predetermined heating temperature, and for releasing a pressurized heated air flow through the first air receiver outlet 502.

According to an embodiment of the present invention, the hybrid system 10 also includes a second air receiver 6 having a second air receiver inlet 601, and a second air receiver outlet 602. The second air receiver 6 is configured for receiving heat removal air through the first air receiver inlet 601, and further heating the received air to a predetermined heating temperature, and then releasing the heated air through the second air receiver outlet 602.

According to an embodiment of the present invention, the first air receiver 5 and the second air receiver 6 are mounted on the tower 25 under the wind turbine electric power generation system 101. An example of the construction of the first air receiver 5 and the second air receiver 6 will be described herein below.

According to an embodiment of the present invention, the hybrid system 10 also includes a plurality of heliostats 1 arranged near the first air receiver 5 and the second air receiver 6. The heliostats 1 are configured for receiving solar light and reflecting the solar light into the first air receiver 5 and into the second air receiver 6.

According to an embodiment of the present invention, the hybrid system 10 also includes a thermal energy storage system 3. The thermal energy storage system 3 is configured as a pressure tank and includes a housing that includes a compressed atmospheric air inlet port 42, a preheated air outlet port 41, a hot air port 40 and a heat exchange air inlet 43. The hot air port 40 is in gas flow communication with the second air receiver inlet 601 of the second air receiver 6. According to this embodiment, the thermal energy storage system 3 contains heat capacitive elements 36. Examples of the heat capacitive elements include, but are not limited to, a ceramic three dimensional matrix, checker-work heat medium elements, a rock-bed, pebbles (not shown), etc.

According to an embodiment of the present invention, the heat exchange air inlet 43 of the thermal energy storage system 3 is in air flow communication with the air cooling system 105 through a heat removal pipe 16 equipped with a heat removal valve 160. The heat removal pipe 16 is connected to the heat removal air outlet 104 at one end and to the heat exchange air inlet 43 at another end. The ambient air heated in the air compressing system 102 and released through the heat removal air outlet 104 is fed to the thermal energy storage system 3 through the heat exchange air inlet 43. Thus, the thermal energy storage system 3 can receive thermal energy transferred from both the air cooling system 105 and from the second air receiver 6.

According to an embodiment of the present invention, the hybrid system 10 also includes a second three-ports valve 26 having two second valve inlets 262 and 263, and one second valve outlet 261. The second valve inlet 262 is in gas flow communication with the first air receiver outlet 502 for receiving the pressurized heated air flow from the first air receiver 5, whereas the second valve inlet 263 is in gas flow communication with the second air receiver outlet 602 for receiving the pressurized heated air flow from the second air receiver 6. The second three-ports valve 26 is configured to permit connection of the second valve outlet 261 to either one or to both two second valve inlets 262 and 263.

According to an embodiment of the present invention, the hybrid system 10 also includes an electric power thermal generation system 111 configured to receive the pressurized heated air flow released from the second valve outlet 261 and supplied to the electric power thermal generation system 111 through a hot air pipe 7 to generate electric power.

According to an embodiment of the present invention, the electric power thermal generation system 111 includes a thermal turbine 23 that is driven by the pressurized heated air flow provided by hot air pipe 7. The thermal turbine 23 rotates a turbine shaft 112 connected to an electrical thermal generator 17 for driving thereof. The electrical thermal generator 17 converts the mechanical power received from the turbine into electrical power. The electrical power generated by the thermal generator 17 of the electric power thermal generation system 111 can be combined with electrical power generated by the generator 27 of the wind turbine electric power generation system 101.

Figure 2:
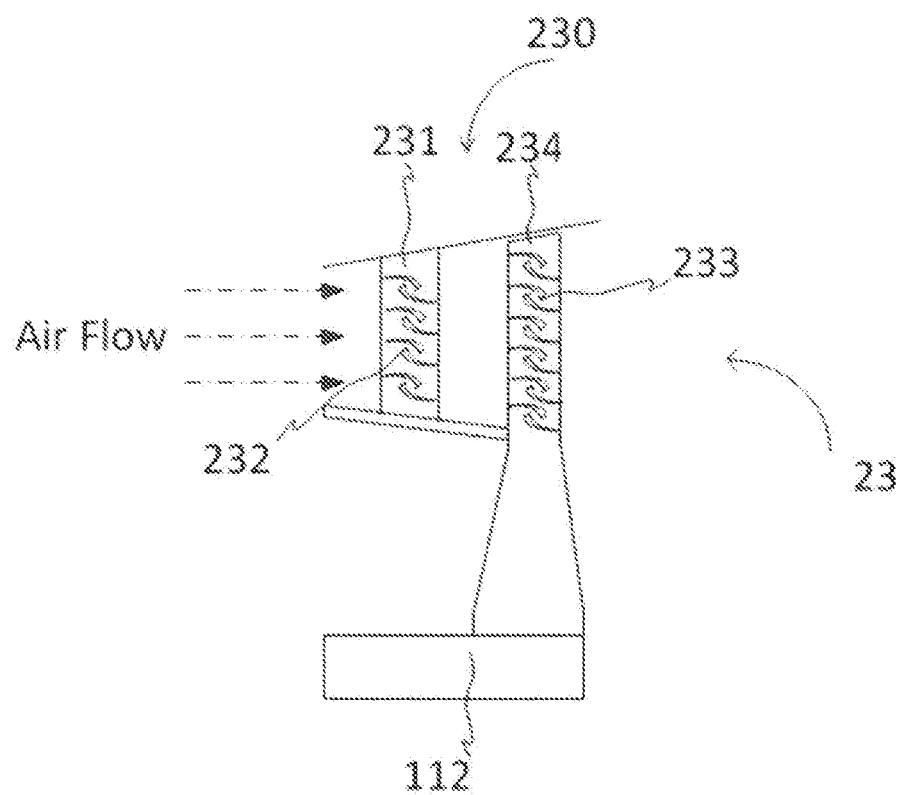
FIG. 2 is a schematic cross-sectional view of a thermal turbine, according to one embodiment of the present invention.

Referring to FIG. 2, a schematic cross-sectional view of the thermal turbine 23 is illustrated, according to one embodiment of the present invention. The thermal turbine 23 includes a plurality of rotor-stator pairs 230. A stator 231 of each rotor-stator pairs 230 includes a plurality of nozzle blades 232, whereas a rotor 234 of each rotor-stator pairs 230 includes a plurality of rotor blades 233.

The rotor blades 233 are connected to the shaft 112. As the pressurized heated air flow passes between the nozzle blades 232 and rotor blades 233, the pressure provided by this flow gradually decreases to ambient pressure. In operation, the energy which was provided in the flow (in terms of both pressure and temperature) is converted to mechanical power which drives the shaft and consequently the thermal generator (17 in FIG. 1).

Turning back to FIG. 1, according to an embodiment of the present invention, the hybrid system 10 also includes a fan 2. The fan 2 is in gas flow communication with the second air receiver 6 through the second air receiver inlet 601, and with the thermal energy storage system 3 through the preheated air outlet port 41. The fan 2 is configured to provide air circulation for transferring heat from the second air receiver 6 to the thermal energy storage system 3 through a circulating air inlet 604.

According to an embodiment of the present invention, the hybrid system 10 also includes a plurality of heliostats 1 configured for receiving solar light and reflecting the solar light into said first air receiver 5 and said second air receiver 6.

The system can be operated in the following four modes of operations.

According to an embodiment of the present invention, during off peak hours (e.g. during night periods), when the demand for electricity is lower, and as a consequence there may be a decrease in the electrical power wholesale price, a part of the electric energy generated by the wind turbine electric power generation system 101 can be used by other elements of the system 10. This mode of operation herein is referred to as a "preheating mode".

According to an embodiment of the present invention, the air compressing system 102 can be activated by using the electricity generated by the wind turbine electric power generation system 101 to compress atmospheric air during off peak hours. The thermal energy storage system 48 can be used to store the compressed that is provided by the air compressing system 102.

In the preheating mode of operation, the preheated air that is released from the heat removal air outlet 104 of the cooling system is fed to the thermal energy storage system 3, where it passes between the heat capacitive elements 36, and transfers thermal energy to the heat capacitive elements 36. The preheating process lasts as long as required so that the heat capacitive elements 36 become uniformly heated to the preheating temperature, that can, for example, be around 200° C. After the preheating of thermal energy storage system 3, the heat removal valve 160 is closed to avoid further release of the heated air from the thermal energy storage system 3 during operation.

During peak hours, when solar energy is available, the system can be operated in further modes of operation.

Thus, the second mode of operation is associated with "direct" electric power generation. In this mode that is hereinafter referred to as a "direct thermo-heating mode", the first three-ports valve 20 is switched to connect the first valve inlet 201 to the first valve outlet 203. In this case, the high pressure air that is discharged from the outlet port 482 of the thermal energy storage system 48 is directly fed to the first air receiver 5 until the introduced air reaches pressure equilibrium within these two containers. This first mode is associated with the operation of the first air receiver 5 that receives the compressed atmospheric air flowing from the compressed air storage system 48 through a cold air pipe 8.

As described above, the compressed air in the compressed air storage system 48 can be prepared during off peak hours and stored therewithin. As described above, the first air receiver 5 is in air flow communication with the compressed air storage system 48 through the first three-ports valve 20. Accordingly, the compressed air is heated by the first air receiver 5 to a predetermined heating temperature, since one or more heliostats 1 reflect high concentrated solar flux thereon. Thus, pressurized heated air released from the first air receiver outlet 502 of the first air receiver 5 is transferred to the second three-ports valve 26 that is switched to connect the second valve inlet 262 to the second valve outlet 261. The second valve outlet 261 is connected to the hot air pipe 7 that transfers pressurized heated air that is released from the first air receiver outlet 502 of the first air receiver 5 to the electric power thermal generation system 111 for generation of electric power. The predetermined heating temperature of pressurized heated air can, for example, be around 800° C., with the pressure in the range of 10-250 bar.

The last two (third and fourth) modes of operation of the hybrid system 10 are associated with the operation of the second air receiver 6 that receives compressed air preheated by the thermal energy storage system 3 that is fed by the cold compressed air from the thermal energy storage system 48. It should be noted that the third and fourth this modes of operation can either be running separately or simultaneously with the "direct thermo-heating mode" of operation.

In the third mode of operation (that is also hereinafter referred to as a "thermal charge" mode), the first three-ports valve 20 is switched to connect the first valve inlet 201 to the first valve outlet 202. In this case, the high pressure air is first discharged from the outlet port 482 of the thermal energy storage system 48 and is fed to the thermal energy storage system 3 through the compressed atmospheric air inlet port 42. This high pressure air is further transferred from the thermal energy storage system 3 to the second air receiver 6 through the preheated air outlet port 41, a preheated air pipe 9 equipped with a preheated air valve 91, and is introduced into the second air receiver 6 through the second air receiver inlet 601. The filling with high pressure air is continued as long as required until the introduced high pressure air reaches pressure equilibrium within these two containers.

Then, the fan 2 is turned on to provide circulation of the high pressure air between the second air receiver 6 and the thermal energy storage system 3 through a pipe which connects the thermal energy storage system 3 to the fan 2 to allow air flow to circulate between the second receiver 6 and the thermal energy storage system 3. When solar energy is available, the heliostats 1 reflect light into the second air receiver 6. The air which flows through the second air receiver 6 can consequently be heated, since the second air receiver 6 is illuminated by the solar flux. The air can be released from the second air receiver 6 at a high temperature, e.g., at a temperature of around 800° C. This hot air is fed into thermal energy storage system 3 as a part of the circulation process through the hot air port 40.

As the high temperature air (e.g. at the temperature of around 800° C.) passes through the thermal energy storage system 3, it exchanges heat with the heat capacitive elements 36 located within the thermal energy storage system 3 and leaves the thermal energy storage system 3 through the preheated air outlet port 41 at a preheating temperature (e.g. at a temperature of around 200° C.).

According to an embodiment, the minimal temperature of the air which is released from the preheated air outlet port 41 of the thermal energy storage system 3 depends on the temperature of the air which enters the thermal energy storage system 3 through the compressed atmospheric air inlet port 42.

According to an embodiment, the thermal energy storage system 3 is configured to have a gradually variable temperature profile in operation. Preferably, the gradually variable temperature profile is a thermocline temperature profile that sharply separates regions differing in temperature, so that the temperature gradient across the heat capacitive elements 36 is abrupt.

In particular, the thermocline profile temperature manifests that the highest temperature of the heat medium elements are close to the hot air port 40 (e.g., around 800° C.) which gradually decreases to the lowest temperature (e.g., around 200° C.) at the preheated air outlet port 41.

According to another embodiment, in order to maintain the thermocline profile temperature with the highest temperature of the heat medium elements near the hot air port 40, according to an embodiment of the present invention, the thermal energy storage system 3 includes a heater 49 arranged at a side of the thermal energy storage system 3 near the hot air port 40. The heater 49 is configured to maintain the highest temperature of the thermocline profile during operation of the hybrid system 10.

According to an embodiment of the present invention, the heater 49 includes an electrical coil (not shown) which is activated by electrical power. The electrical coil is electrically coupled to the wind turbine electric power generation system 101 and receives electric power therefrom for operation. The electrical coil can, for example, receive electric power from the wind turbine electric power generation system 101 during off-peak hours when the demand for electricity is low. Likewise, use of the heater 49 may be most beneficial when the weather is not favorable for operation of the first air receiver 6 and the second air receiver 6.

The electrical power received from the wind turbine electric power generation system 101 is converted by the heater 49 to heat according to the Joule's Law that defines the amount of heat liberated in a conductor when an electric current passes through it. Joule's Law states that when a current of voltaic electricity is propagated along a conductor, the heat evolved in a given time is proportional to the resistance of the conductor multiplied by the square of the electric intensity.

As soon as the thermal energy storage system 3 is charged with heat, the hybrid system 10 is switched to operate in the fourth mode (that is hereinafter referred to as a "thermal discharge" mode). In this mode, —the heat that is stored in the thermal energy storage system 3 is used for heating the compressed air and transferring this heated compressed air to the electric power thermal generation system 111 for generation of electric power.

In operation, the preheated air valve 91 and the heat removal valve 160 are closed. The first three-ports valve 20 is switched to connect the first valve inlet 201 to the first valve outlet 202. In this case, the high pressure air having the ambient temperature and discharged from the outlet port 482 of the thermal energy storage system 48 is fed to the thermal energy storage system 3 through the compressed atmospheric air inlet port 42 from the compressing system 102. The compressed air passes through the thermal energy storage system 3 and receives thermal energy from the heat capacitive elements 36, and leaves the thermal energy storage system 3 at an elevated predetermined temperature and a high pressure predetermined through the hot air port 40. The predetermined temperature can, for example, be in the range of 700 to 900° C., whereas the predetermined temperature can, for example, be in the range of 10 bar to 250 bar.

Thus, the pressurized heated air released from the second air receiver outlet 602 of the second air receiver 6 is transferred to the second three-ports valve 26 that is switched to connect the second valve inlet 263 to the second valve outlet 261. As described above, the second valve outlet 261 is connected to the hot air pipe 7 that transfers the pressurized heated air released from the first air receiver outlet 602 of the second air receiver 6 to the electric power thermal generation system 111 for generation of electric power.

Figures 3A, 3B:
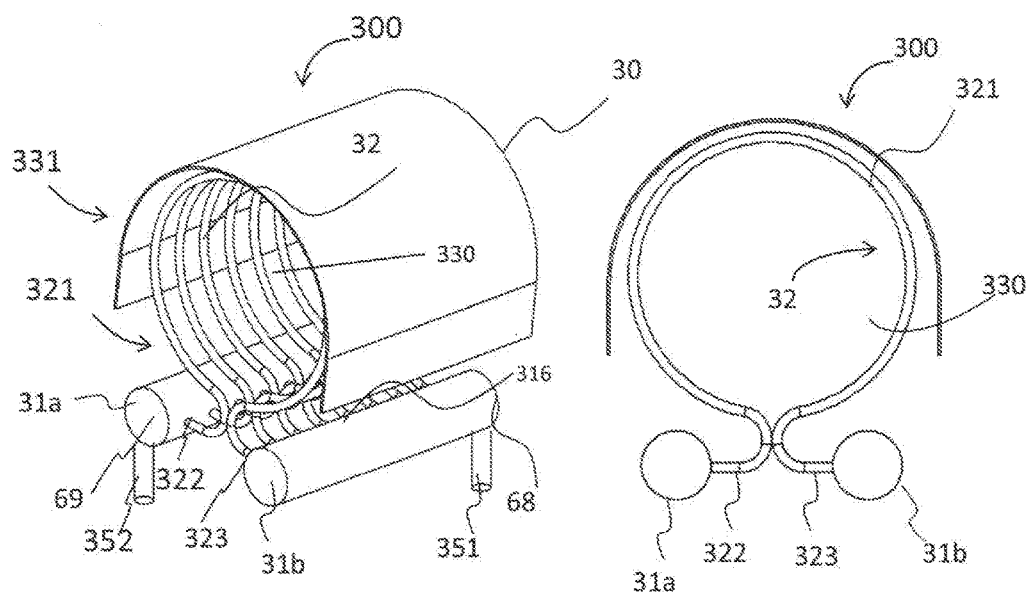
FIGS. 3A and 3B show plane and side views of an air receiver of the hybrid system of FIG. 1, correspondingly, according to an embodiment of the present invention.

Referring to FIGS. 3A and 3B, plane and side views of an air receiver 300 are illustrated, correspondingly, according to an embodiment of the present invention. According to the present invention, the first air receiver 5 and the second air receiver 6 are preferably configured as the air receiver 300, but this is not mandatory. As shown in FIG. 3, the air receiver 300 includes two receiver headers 31a and 31b having a tubular shape and being in a parallel arrangement. The air receiver 300 also includes a plurality of absorber tubes 32 coupling the receiver headers 31a and 31b to provide a gas communication between the receiver headers 31a and 31b. Each absorber tube 32 has an omega-type shape having a round portion 321 and two leg portions 322 and 323 at the ends of the absorber tube 32.

Figure 3C:
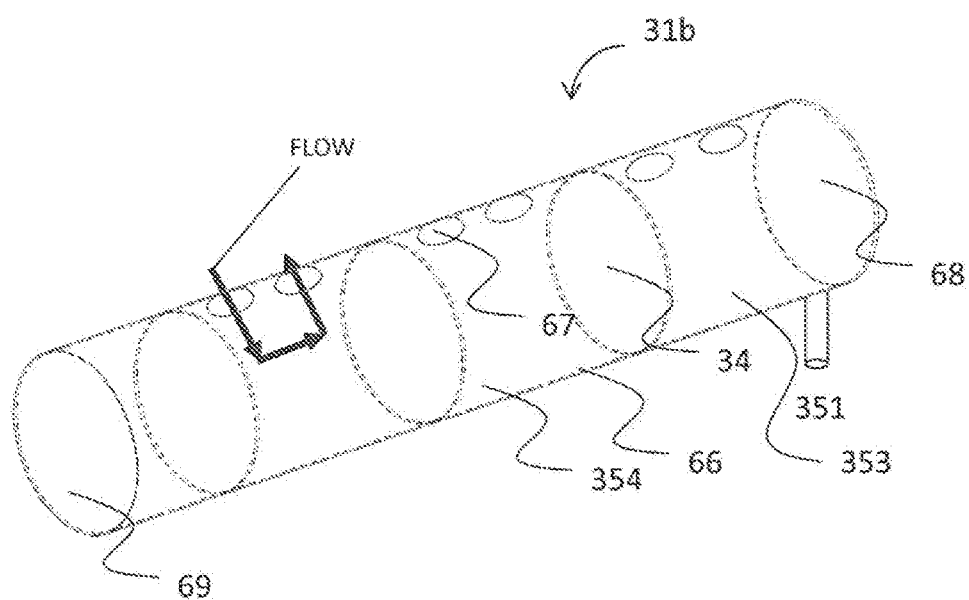
FIG. 3C shows a perspective view of a tubular header of the air receiver of FIG. 2, according to an embodiment of the present invention.

FIG. 3C shows a perspective schematic view of one such the tubular header 31b, according to an embodiment of the present invention. It should be noted that the tubular header 31a has a similar configuration, mutatis mutandis. Each tubular header includes a plurality of header partition plates 34 that separate the inner volume of the header into several sections. Each section is defined as the volume enclosed between two sequential header partition plates 34 which are attached to an inner header wall 66. The header partition plates 34 can be attached to the inner surface of the header walls. The attachment can be carried out by using any suitable technique selected from, but not limited to, welding, brazing, etc.

The receiver headers 31a and 31b have a plurality of header openings 67 arranged in the walls of the headers 31a and 31b along their length. As shown in FIGS. 3A and 3B, the leg portions 322 and 323 of the absorber tubes 32 are attached to the header openings 67 of the headers 31a and 31b to provide a gas flow communication between the absorber tubes and the header. As shown in FIG. 3B, the end of the leg portions 322 is attached to the headers 31a, whereas the end of the leg portions 323 is attached to the receiver header 31b.

Each section has at least two header openings 67. In cases where only two header openings 67 are arranged in each section, one header opening 67 can be used for the air flow that passes from the header into the absorber tube, and another for the air flow that passes from the absorber tube into the header. It should be understood that when desired, several header openings 67 can be used for passing the air flow from the header into the absorber tube and vice versa. This configuration provides a serpentine air flow of the compressed air introduced in a header inlet port 351 arranged at a rear end 68 of the header 31b to a header outlet port 352 arranged a front end 69 of the other header 31a through the multitude of the absorber tubes 32.

According to an embodiment, the absorber tubes 32 are painted with high emissivity black paint in order to maximize absorption of solar flux. For example, an inner diameter of the absorber tube can be in the range of 15 cm to 30 cm. A typical inner diameter of the header can be in the range of 13 cm to 28 cm.

According to the embodiment shown in FIGS. 3A and 3B, the air receiver 300 also includes a receiver shield 30 surrounding the round portion 321 of the absorber tubes 32 and forming a receiver cavity 330 in which the round portion 321 of the absorber tubes 32 are located. The receiver shield 30 preferably has a highly reflective inner surface that faces the absorber tubes 32, in order to provide multiple reflections of the light flux entering through a receiver aperture 331 within the receiver cavity 330. The solar flux that tends to escape from the receiver can be partially recovered when it bounces back from the shield and is absorbed by the absorber tubes 32. Likewise, the ceramic shield is configured to insulate the absorber tubes 32 from ambient conditions, in order to minimize irradiation losses due to the temperature increase.

The receiver shield 30 can, for example, be made from any suitable material having high thermo-stability. An example of a material suitable for the shield 30 includes, but is not limited to, white ceramic.

In operation, the compressed air is introduced in a header section (353 in FIG. 3C) that is adjacent to the end 68 of the receiver header 31b through the header inlet port 351. The air flow then passes through the header openings 67 arranged in this section into the absorber tube(s) 32 attached to these header openings 67 at one end of the tubes. The air flow enters the corresponding section receiver headers 31a to which the absorber tube(s) 32 are attached at another end of the absorber tube(s) 32. Then, the air flow enters the adjacent absorber tube(s) 32 attached to the neighboring openings in the section and flows back into the next section 354 of the receiver header 31b, which is next after the section 353 adjacent to the rear end 68 of the receiver headers 31b.

This air flow then continues to flow in a serpentine way. In operation, solar flux illuminates the absorbed tubes 32 by initially passing through the aperture (331 in FIG. 3A). The solar flux is absorbed by the absorbed tubes 32 and thus is converted into thermal energy and raises the temperature of the air flowing through the absorbed tubes 32. The air flow has a minimal temperature when it is introduced in the inlet port 351, while it has the highest temperature when it exits the receiver through the header outlet port 352 at the front end 69 of the other header 31a.

Figure 4:
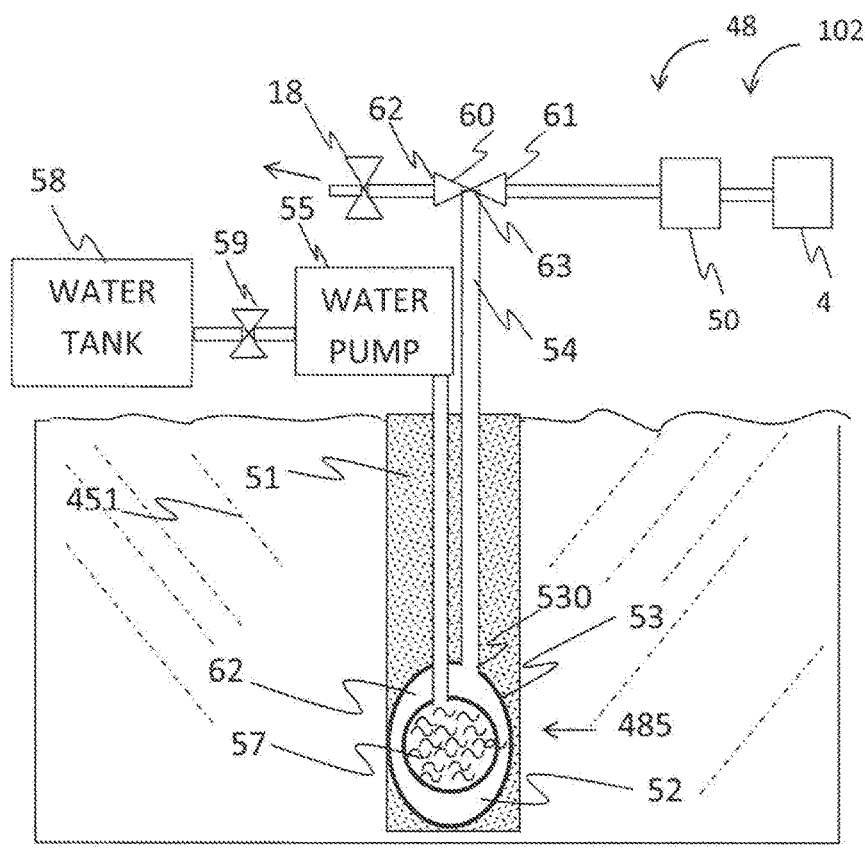
FIG. 4 is a schematic cross-sectional view of the compressed air storage system of the hybrid system of FIG. 1, according to an embodiment of the present invention.

Referring to FIG. 4, a schematic cross-sectional view of the compressed air storage system 48 is illustrated, according to an embodiment of the present invention. The compressed air storage system 48 includes a cavity 52 arranged in the ground at a predetermined depth, in an underground pressure tank 485 mounted within the cavity. The underground pressure tank 485 includes an inflatable elastic balloon 53 having a balloon port 530 that in operation can function as an inlet port (481 in FIG. 1) and/or outlet port (482 in FIG. 1), mutatis mutandis.

The inflatable elastic balloon 53 can, for example, be made of an elastic, durable, strong plastic or rubber material having a braid or other reinforcement that can sustain large deformation. The large deformation can, for example, be in the range of 200% to 1000% volume change. It is also required that the balloon's material can resist underground chemical reactions (e.g. soil's deposits) and moisture (e.g. rain) infiltration.

The compressed air storage system 48 also includes an air conductive pipe 54 coupled to an inner volume of the inflatable elastic balloon 53 through the balloon port 530. The port 530 can be coupled either to the first valve inlet 201 or to the air compressing system 102 through the air conductive pipe 54 equipped with a three-ports air valve 60. The three-ports air valve 60 has a first port 61 coupled to the air compressing system (102 in FIG. 1), a second port 62 coupled to the first valve inlet 201 and a third port 63 coupled to the inflatable elastic balloon 53 through the air conductive pipe 54.

In operation, when filling of the compressed air storage system 48 is desired, the three-ports air valve 60 is switched to connect the first port 61 to the third port 63, thereby coupling the inflatable elastic balloon 53 to the air compressing system 102. On the other hand, in order to connect the air from the inflatable elastic balloon 53 to the first valve inlet (201 in FIG. 1), the three-ports air valve 60 is switched to connect the second port 62 to the third port 63.

In order to produce the compressed air storage system 48, according to this embodiment, a borehole 51 is drilled in the ground to a predetermined depth. The depth of the borehole 51 is mainly determined by the soil properties and the maximal value of the desired magnitude of the pressure of the compressed air within the underground pressure tank 485 of the compressed storage system 48. For example, the depth of the borehole 51 can be in the range of 10 m to 100 m. A diameter of the drilled borehole 51 is defined by the desired dimensions of the pressure tank. For example, the diameter of the borehole 51 can be in the range of 1 m to 10 m. According to one embodiment, a cavity for pressure tank that is formed in the ground has an ellipsoidal shape; however, other shapes are also contemplated.

Once the borehole is drilled, an inflatable elastic balloon 53 is placed at the bottom of the borehole 51. The inflatable elastic balloon 53 is then connected to a high pressure booster 50 via the air conductive pipe 54. The high pressure booster 50 can provide air pressure, for example, in the range of 10 bar to 250 bar.

The volume of the balloon at low pressure is designed to be slightly less than the volume of the cavity 52. For creation of the cavity 52, the balloon is initially filled up with air at low pressure. Then, sand is gradually placed between the elastic balloon surface and the inner surface of the borehole. Then, the borehole is filled back using the soil that has been removed when the borehole was drilled initially. During this process, the filling soil is watered and compacted. During this process, the air pressure in the balloon is gradually increased by using an air compressor 4. The pressure in the balloon can, for example, be increased to a magnitude of about 250 bar by the end of the filling process when the borehole is completely covered. It should be understood that the pressure increase can cause compaction of the soil around the balloon. The soil resistance to the pressure will be along soil shear planes 451. Since the inflatable elastic balloon 53 is made from an elastic-plastic material, it accommodates large soil deformation.

According to a further embodiment of the present invention, the underground pressure tank 485 of the compressed air storage system 48 includes a water balloon 57 which is arranged within the inflatable elastic balloon 53. The water balloon 57 is also made from an elastic material capable to accommodate deformation in the range of 200%-1000% of its initial volume. The water balloon 57 is connected to a water pump 55 via a water pipe 56. The water pump 55 is coupled to a water tank 58 via a water relief valve 59. The water pump 55 is configured to transmit water from the water tank 58 to the water balloon 57.

The purpose of the water balloon 57 is to maintain a constant high pressure of air in the inflatable elastic balloon 53 during operation, both when the air is introduced into the elastic balloon as well as when a portion of the air is released from the inflatable elastic balloon 53. Thus, in order to maintain the air pressure within the elastic balloon 53 at a high constant pressure, the volume of a region 62 trapping the air between the inflatable elastic balloon 53 and the water balloon 57 can be varied. Initially, the elastic balloon 57 is filled with air at high pressure. During this filling process, the water balloon 57 is not used. At the end of the filling process, the soil around the elastic balloon becomes compacted so as to maintain the maximal desired pressure of the underground pressure tank 485.

The air is then discharged from the inflatable elastic balloon 53 to a minimal desired pressure value. This minimal desired pressure value can, for example, be in the range of 5% to 30% of the maximal desired pressure. Once the air has been discharged, the water pump 55 starts operating to increase water pressure in the water balloon 57 to the maximal desired pressure by introducing water under high pressure into the water balloon 57.

As a result, the air that is trapped within the region 62 between the water balloon and the elastic balloon reaches pressure equilibrium with the water. As soon as the water balloon 57 reaches a desired volume, the water pump is turned off. The water relief valve 59 is configured to release water from the water balloon 57 to the water tank 58 when the water pressure at the water balloon 57 exceeds a threshold pressure value established for the valve relief valve 59. According to this embodiment, the water relief valve is set to a threshold pressure that is slightly smaller than the maximal desired pressure of the air within the elastic balloon 53.

In the next step, the two ways air valve 60 is switched to connect the port 61 to the port 63, which allows air communication between the air compressing system 102 and the elastic balloon 53 for charging the compressed air storage system 48. During the charging mode, air is delivered to the elastic balloon 53 to the maximal desired pressure. Due to the pressure difference between the air and the water in favor of the air water contained inside the water balloon, the excessive water will pass through the water relief valve 59 back to water tank 58. The volume of the water balloon 57 can decrease accordingly, while the air which is trapped in the region 62 between the elastic balloon 53 and the water balloon 57 can increase. As a result, the air compressing system 102 charges the elastic balloon with air at a constant pressure that significantly increases the compression efficiency.

During the discharging mode, air is released from the elastic balloon. According to an embodiment, a volume of the region 62 between the elastic balloon 53 and water balloon 57 in which the air is contained, remains constant. Thus, release of the air results in decrease of the air pressure. The water pressure in return also reduces to achieve pressure equilibrium with the air. At this stage the water pump is activated to compensate for the decrease in water pressure. As a result, water at high pressure is pumped into the water balloon 57 thus bringing the water pressure again to the maximal desired pressure, while increasing the volume of the water balloon 57, and correspondingly decreasing the volume of the region 62. Since the matching pressure condition between water balloon 57 and the elastic balloon 53 is thermodynamically achieved, the air pressure within the region 62 will also be set back to the maximal desired pressure. This air pressure compensation mode can be maintained as long as the air is completely released from the region 62.

Figure 5:
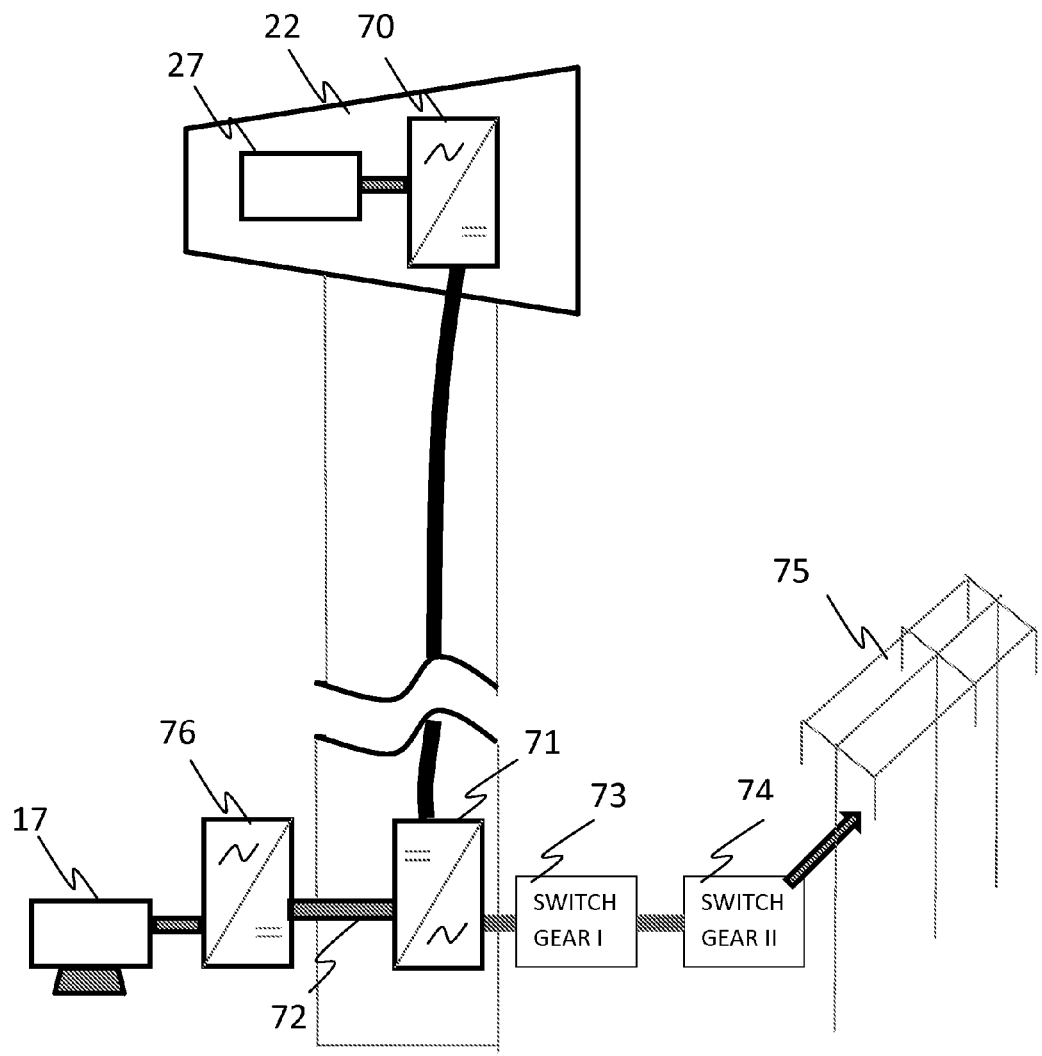
FIG. 5 is a general electrical scheme for integration of electrical power generated by the wind turbine electric power generation system and by the electric power thermal generation system of the hybrid system of FIG. 1 for supplying the electrical power to a grid, according to one embodiment of the present invention.

Referring to FIG. 5, a general electrical scheme for integration of electrical power generated by the wind turbine electric power generation system 101 and by the electric power thermal generation system 111 for supplying the electrical power to a grid 75 is shown, according to one embodiment of the present invention.

As shown in FIG. 5, the wind electric power generator 27 is connected to a wind turbine rectifier 70 which is located within the nacelle section 22. In operation, the rectifier 70 converts alternating current (AC) electrical power generated by the wind electric power generator 27 into direct current (DC) electrical power. On the other hand, the electrical thermal generator 17 of the electric power thermal generation system 111 is coupled to a thermal rectifier 76 that converts the AC electrical power generated by the thermal rectifier 76 into DC electrical power. The DC electrical power from the rectifiers 70 and 76 are combined and introduced into a common DC/AC inverter 71. The common DC/AC inverter 71 converts the common DC electrical power back to AC electrical power which has a matching frequency with the grid (e.g. 50 Hz or 60 Hz). The AC electrical power generated by the common DC/AC inverter 71 is then sequentially introduced into one or more switch gears 73 and 74 arranged in series and coupled to the grid 75. The switch gears 73 and 74 are configured to adapt the generated voltage to a voltage of the grid 75.

As can be seen in FIG. 5, this embodiment provides a configuration in which the electric power generated by both sources of electric power (wind and solar) are decoupled from the grid. In this case, the electric generator 27 operated by wind energy, and the thermal generator 17 operated by solar energy, can rotate at different rotational speeds.

Figure 6:
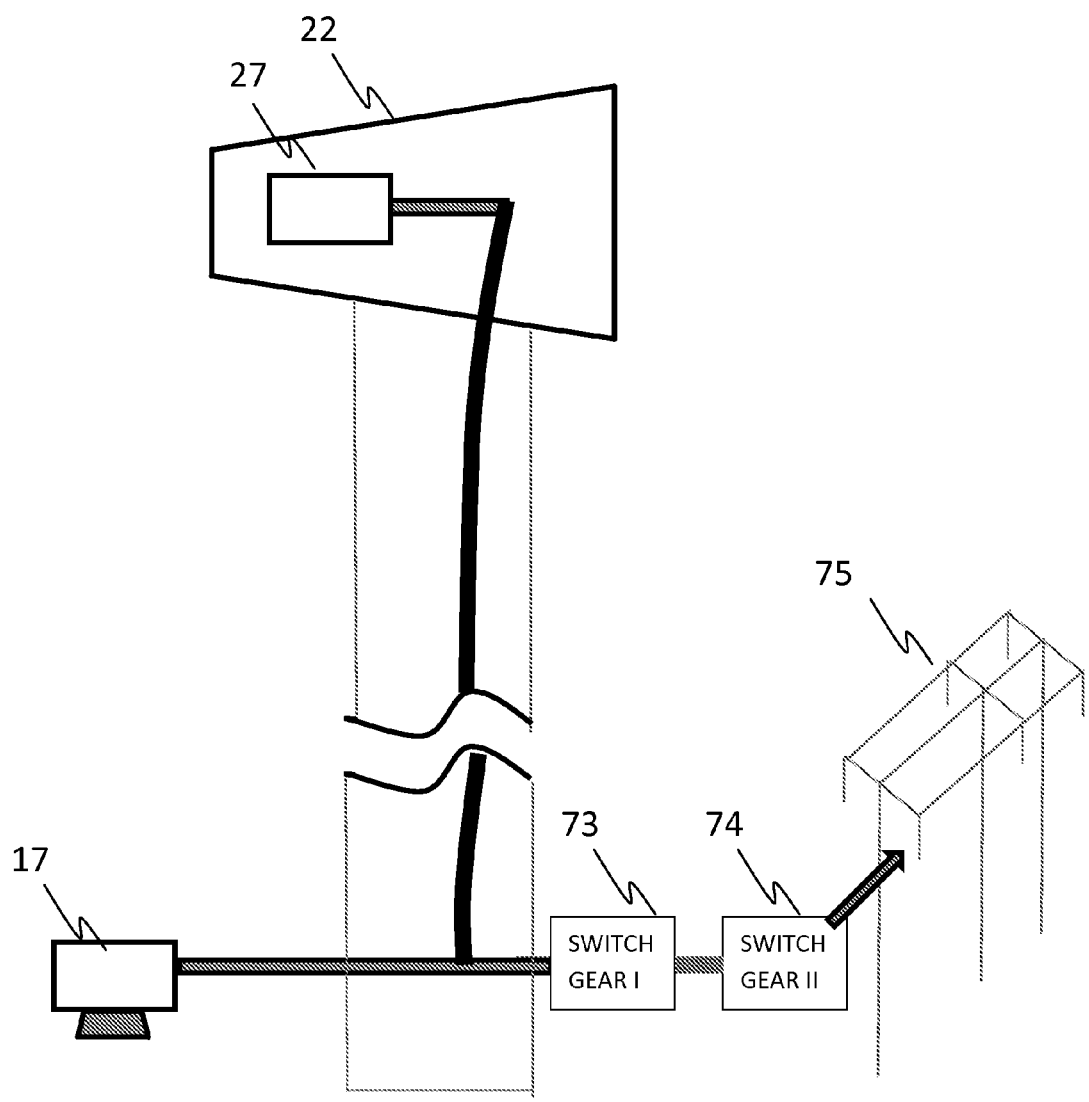
FIG. 6 is a general electrical scheme for integration of electrical power generated by the wind turbine electric power generation system and by the electric power thermal generation system of the hybrid system of FIG. 1 for supplying the electrical power to a grid, according to one embodiment of the present invention.

Referring to FIG. 6, an electrical scheme for integration of electrical power generated by the wind turbine electric power generation system 101 and by the electric power thermal generation system 111 for supplying the electrical power to a grid 75 is shown, according to another embodiment of the present invention. This configuration differs from the configuration shown in FIG. 5 in the fact that both the thermal and the wind power generation infrastructure elements are directly coupled to the grid without AC/DC invertors. In this case, the grid frequency (that is usually 50 Hz or 60 Hz) dictates the rotational speed of both generators. In this case, the wind generator 27 and the thermal generator 17 both have the same frequency, and thus their AC electrical power can be provided to the grid.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A hybrid system for electric power generation from solar-thermal energy and wind energy sources, comprising:
 a wind turbine electric power generation system (101) configured for receiving wind to generate electric power;
 an air compressing system (102) including:
  a compressor (4) electrically coupled to said wind turbine electric power generation system (101) and driven by the electric power received therefrom, and
  an air cooling system (105) configured for passing atmospheric air through the compressing system (102) for cooling thereof and for releasing heat removal air having a temperature higher than a temperature of the atmospheric air;
 a compressed air storage system (48) configured for receiving compressed atmospheric air from said air compressing system (102) and for storing the compressed atmospheric air at a predetermined pressure;
 a first air receiver (5) configured for receiving the compressed atmospheric air flowing from said compressed air storage system (48), heating the compressed atmospheric air to a predetermined heating temperature, and releasing a pressurized heated air flow;
 a thermal energy storage system (3) being in air flow communication with the air cooling system (105) and with said compressed air storage system (48), said thermal energy storage system (3) configured for storing thermal energy transferred from the air cooling system (105) and preheating the compressed atmospheric air provided by said compressed air storage system (48);
 a second air receiver (6) being configured for receiving the preheated compressed air flowing from said thermal energy storage system (3), further heating the preheated compressed air to a predetermined heating temperature and for releasing a pressurized heated air flow;
 a plurality of heliostats (1) configured for receiving solar light and reflecting the solar light into said first air receiver (5) and said second air receiver (6);
 a three-ports valve (26) having a first valve inlet (262) being in gas flow communication with said first air receiver (5), a second valve inlet (263) being in gas flow communication with said second air receiver (6) and a valve outlet (261); and
 an electric power thermal generation system (111) being in gas flow communication with the valve outlet of said three-ports valve (26), and configured for receiving a pressurized heated air flow from either one or from both the first air receiver (5) and the second air receiver (6) to generate electric power.

2. The hybrid system of claim 1, further comprising a second three-ports valve (20) having one first valve inlet (201) being in gas flow communication with the compressed air storage system (48) and two first valve outlets (202, 203), said second three-ports valve (20) configured to permit connection of the first valve inlet (201) to either of the first valve outlets (202, 203).

3. The hybrid system of claim 1, further comprising a fan (2) being in gas flow communication with said second air receiver (6) and with said thermal energy storage system (3); the fan being configured to provide air circulation between said second air receiver (6) and said thermal energy storage system (3) for transferring heat therebetween.

4. The hybrid system of claim 1, wherein said wind turbine electric power generation system (101) includes:
 a tower (25); and
 an electric power generating apparatus (250) rotatably mounted to the tower (25) to rotate about a vertical axis (200) of rotation centrally passing through the tower (25); the power generating apparatus (250) including:
  a blade section (180) comprising a plurality of turbine blades (29), and a rotation hub (28) to which the blades (29) are connected; and
  a nacelle section (22) comprising a rotary speed changing drive system (221) mechanically coupled to the blade section (180), and a wind electric power generator (27) mechanically coupled to the rotary speed changing drive system (221).

5. The hybrid system of claim 1, wherein the air compressing system (102) includes a booster (50).

6. The hybrid system of claim 5, wherein the cooling system (105) includes an air inlet (106) and an air heat removal outlet (104), the air cooling system (105) being configured for receiving the atmospheric air through the air inlet (106), and for releasing the heat removal air through the air heat removal outlet (104).

7. The hybrid system of claim 5, wherein said heat removal air from the air cooling system (105) is fed to the thermal energy storage system (3).

8. The hybrid system of claim 4, wherein the first air receiver (5) and the second air receiver (6) are mounted on the tower (25) under the electric power generating apparatus (250).

9. The hybrid system of claim 4, wherein the thermal energy storage system (3) includes a housing containing heat capacitive elements (36) comprising at least one type of elements selected from a ceramic three dimensional matrix, checker-work heat medium elements, a rock-bed, and pebbles.

10. The hybrid system of claim 1, wherein the electric power thermal generation system (111) includes a thermal turbine (23) activated by the pressurized heated air flows provided by the first air receiver (5) and the second air receiver (6).

11. The hybrid system of claim 4, wherein the electric power generated by the wind turbine electric power generation system (101) is combined with the electric power generated by the electric power thermal generation system (111).

12. The hybrid system of claim 1, wherein the thermal energy storage system (3) is configured to have a gradually varying temperature profile during operation.

13. The hybrid system of claim 12, wherein a highest temperature of the gradually varying temperature profile is around 800° C., and a lowest temperature of the gradually varying temperature profile is around 200° C.

14. The hybrid system of claim 13, wherein the thermal energy storage system (3) includes a heater (49) configured to maintain the highest temperature of the gradually varying temperature profile during operation.

15. The hybrid system of claim 1, wherein at least one air receiver selected from the first air receiver (5) and the second air receiver (6) includes:
   two receiver headers (31a, 31b), each having a tubular shape and being in a parallel arrangement with each other; and
   a plurality of absorber tubes (32) coupling the receiver headers (31a, 31b) to provide a gas communication between the receiver headers (31a, 31b).

16. The hybrid system of claim 15, wherein each absorber tube (32) has an omega-type shape having two leg portions (322, 323) at ends of each absorber tube (32), wherein the ends of each absorber tube (32) are attached to the receiver headers (31a, 31b), and each absorber tube (32) further comprises a round portion (321) positioned between the leg portions (322, 323).

17. The hybrid system of claim 16, wherein the at least one air receiver (5 or 6) also includes a receiver shield (30) surrounding the round portions (321) of the absorber tubes (32), the receiver shield forming a receiver cavity (330) in which the round portions (321) of the absorber tubes (32) are located.

18. The hybrid system of claim 17, wherein the receiver shield (30) has a highly reflective inner surface that faces the absorber tubes (32).

19. The hybrid system of claim 1, wherein the compressed air storage system (48) includes a cavity (52) arranged in the ground at a predetermined depth, and an underground pressure tank (485) mounted within the cavity (52).

20. The hybrid system of claim 19, wherein the underground pressure tank (485) includes an inflatable elastic balloon (53).

21. The hybrid system of claim 19, wherein the underground pressure tank (485) further includes a water balloon (57) arranged within the inflatable elastic balloon (53).

* * * * *